United States Patent
Taylor et al.

(10) Patent No.: US 10,054,334 B2
(45) Date of Patent: Aug. 21, 2018

(54) WATER PRESSURE ALARM

(71) Applicant: Jimmie Don Taylor, El Cajon, CA (US)

(72) Inventors: Jimmie Don Taylor, El Cajon, CA (US); Choi Ting Lau, Santee, CA (US); Nathan James Taylor, El Cajon, CA (US)

(73) Assignee: Jimmie Don Taylor, El Cajon, CA (US)

( * ) Notice: Subject to any disclaimer, the term of this patent is extended or adjusted under 35 U.S.C. 154(b) by 0 days.

(21) Appl. No.: 15/633,554

(22) Filed: Jun. 26, 2017

(65) Prior Publication Data

US 2018/0003411 A1    Jan. 4, 2018

Related U.S. Application Data

(60) Provisional application No. 62/357,854, filed on Jul. 1, 2016.

(51) Int. Cl.
| | |
|---|---|
| *G08B 21/00* | (2006.01) |
| *F24H 9/20* | (2006.01) |
| *E03B 7/07* | (2006.01) |
| *G01L 19/12* | (2006.01) |
| *B23P 19/00* | (2006.01) |

(52) U.S. Cl.
CPC ............ *F24H 9/2007* (2013.01); *B23P 19/00* (2013.01); *E03B 7/071* (2013.01); *E03B 7/075* (2013.01); *G01L 19/12* (2013.01)

(58) Field of Classification Search
CPC .................................................. F24H 9/2007

USPC ....... 340/611, 604, 605, 540, 541; 73/40.5 R
See application file for complete search history.

(56) References Cited

U.S. PATENT DOCUMENTS

| | | |
|---|---|---|
| 130,281 A | 8/1872 | Coughlin |
| 226,165 A | 4/1880 | Earll |
| 4,906,977 A | 3/1990 | Huey-Jeng |
| 5,014,786 A | 5/1991 | Kobayashi |
| 5,283,552 A | 2/1994 | Sol |
| 5,700,956 A | 12/1997 | Huang |
| 8,350,710 B2 * | 1/2013 | Logan ................ G08B 31/00 340/573.6 |
| 9,297,467 B1 | 3/2016 | Goseco |
| 2005/0224118 A1 | 10/2005 | Tornay |
| (Continued) | | |

FOREIGN PATENT DOCUMENTS

CN          201913027 U       8/2011

OTHER PUBLICATIONS

Tsbrownie, DIY Low Water Pressure Alarm—City Water, Well Pump, etc., published to YouTube on Mar. 6, 2014, http://www.youtube.com/watch?v=2deONx9ale4.

*Primary Examiner* — Tai T Nguyen
(74) *Attorney, Agent, or Firm* — Knobbe, Martens, Olson & Bear, LLP

(57) ABSTRACT

A device and system for sensing high pressure in a pressurized water system. The high pressure alarm includes a pressure sensor, controller, and timer. A method of installing a high pressure alarm on a pressurized water system. The high pressure alarm is particularly well-suited for installing under a sink, such as a home kitchen sink, though it can also be installed near other plumbing fixtures or appliances in commercial, residential, or industrial facilities and in outside areas.

24 Claims, 10 Drawing Sheets

(56) References Cited

U.S. PATENT DOCUMENTS

2007/0289635 A1\* 12/2007 Ghazarian ............ F16K 31/055
                                                          137/312
2009/0235992 A1     9/2009 Armstrong \* cited by examiner

WATER PRESSURE ALARM

BACKGROUND OF THE INVENTION

Field

This disclosure relates to a device and system for monitoring water pressure in a plumbing system such as found in residential and office buildings.

Background

In the United States, the water pressure inside most buildings is expected to be between 50 psi and 75 psi. The Uniform Plumbing Code allows a maximum pressure of 80 psi. However, the water pressure in a home or other system can fluctuate over time. As shown in FIG. 1, there are more fluctuations during the day when people are awake and using water more frequently. At night, from around 9 pm to 6 am, there tend to be fewer fluctuations. Throughout the day, there are many drops in pressure, sometimes dropping below 40 psi. Fluctuations to higher pressures are less frequent.

SUMMARY

In one aspect, there is a device for sensing high pressure in a pressurized water piping system comprising a pressure sensor connectable to a power source, the pressure sensor configured to sense a pressure of the pressurized water piping system; a controller in communication with the pressure sensor and a timer, the controller configured to trigger a notification when the sensed pressure is greater than a selected value for a selected time.

In some embodiments, the notification is an electronic signal. In some embodiments, the device further comprises an alert, wherein the notification triggered by the controller is the alert. In some embodiments, the alert is a mechanical alert. In some embodiments, the alert is an audible or visual alert. In some embodiments, the device further comprises the power source, wherein the power source is electrical. In some embodiments, the device further comprises a function control, the function control configured to silence or otherwise inhibit the notification triggered by the controller. In some embodiments, the selected value of pressure is between 75 psi and 90 psi. In some embodiments, the selected value of pressure is between 75 psi and 90 psi and the selected time is 1 minute.

In some embodiments, the device further comprises a housing that houses at least the pressure, timer, and controller. In some embodiments, the pressure sensor, power source, and alarm are positioned in the housing such that the housing has a low profile. In some embodiments, the device further comprises a database in communication with the pressure sensor, wherein the database keeps a record of the pressure measured by the pressure sensor.

In another aspect, there is a system for sensing high pressure in a pressurized water piping system that comprises a water shut-off valve connected to a plumbing fixture or appliance; a pressure sensor fluidly connected to the water shut-off valve; a power source connected to the pressure sensor; and an alert connected to the pressure sensor and power source.

In some embodiments, the system further comprises a timer, wherein the alert is triggered when a pre-determined water pressure condition occurs and pre-determined time has been reached on the timer. In some embodiments, the plumbing appliance is a water heater. In some embodiments, the pressure sensor and the alert are incorporated in the water heater. In some embodiments, the plumbing fixture is a sink. In some embodiments, the system further comprises a water line that connected the pressure sensor to the water shut-off valve. In some embodiments, the system further comprises a housing that houses at least the pressure sensor and the alert.

In another aspect, there is a method for installing a high pressure alarm on a pressurized water system that comprises disconnecting a water line from a shut-off valve; connecting a high pressure alarm to the shut-off valve; and connecting the water line to the high pressure alarm. In some embodiments, the high pressure alarm comprises a pressure sensor, the pressure sensor configured to sense a pressure of the pressurized water piping system; a controller in communication with the pressure sensor and a timer, the controller is configured to trigger a notification when the sensed pressure is greater than a selected value for a selected time; and the timer. In some embodiments, the method further comprises mounting the high pressure alarm near the shut-off valve. In some embodiments, connecting a high pressure alarm to the shut-off valve comprises connecting a tee-fitting to the shut-off valve. In some embodiments, connecting a high pressure alarm to the shut-off valve can be done by a user with little knowledge about plumbing.

In another aspect, there is a kit for sensing high pressure in a plumbing system that comprises a plumbing pressure monitor comprising a housing containing a pressure sensor, controller, and alert. The kit also includes a tee-fitting and a conduit that is connectable to the pressure sensor at one end and the tee-fitting at the other.

DETAILED DESCRIPTION

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the development should not be taken to imply that the terminology is being re-defined herein to be restricted to including any specific characteristics of the features or aspects of the technology with which that terminology is associated.

Referring back to FIG. 1, it may be noted that this data set exhibits some increasing spikes in water pressure, sometimes nearing 70 psi. Conventionally, perhaps because low pressure fluctuations appear to be more frequent and dramatic than high pressure spikes, devices have been described and produced that identify when a significant drop in pressure occurs in a plumbing system. Monitoring low pressure conditions can also be useful because abnormally low pressure in a plumbing system can be an indicator that there is a leak in the plumbing system. On the other hand, high pressure is not an indicator of a leak, but high pressure can cause significant damage to a plumbing system and the appliances and/or fixtures that are attached to it. Common plumbing components, such as toilet supply lines, toilet fill valves, refrigerator supply lines, angle-stop valves, water filters, water dispensers, dishwashers, washing machines, water coolers, etc., are designed to operate safely and effectively up to a maximum water pressure. If the pressure in a plumbing supply system is too high, components connected to the system may fail prematurely, causing leaks to occur. For example, high pressure may cause faucets, shower valves, water heater temperature relief valves, or water heater pressure relief valves to leak or drip. Water heater relief valves frequently leak due to excessive pressure. Excessive water pressure can shorten the life of plumbing fixtures and appliances, such as water heaters, washing machines, dishwashers, faucets, hoses, valves, irrigation systems, etc. Excessive water pressure can also cause water hammer or noisy pipes.

Figure 2:
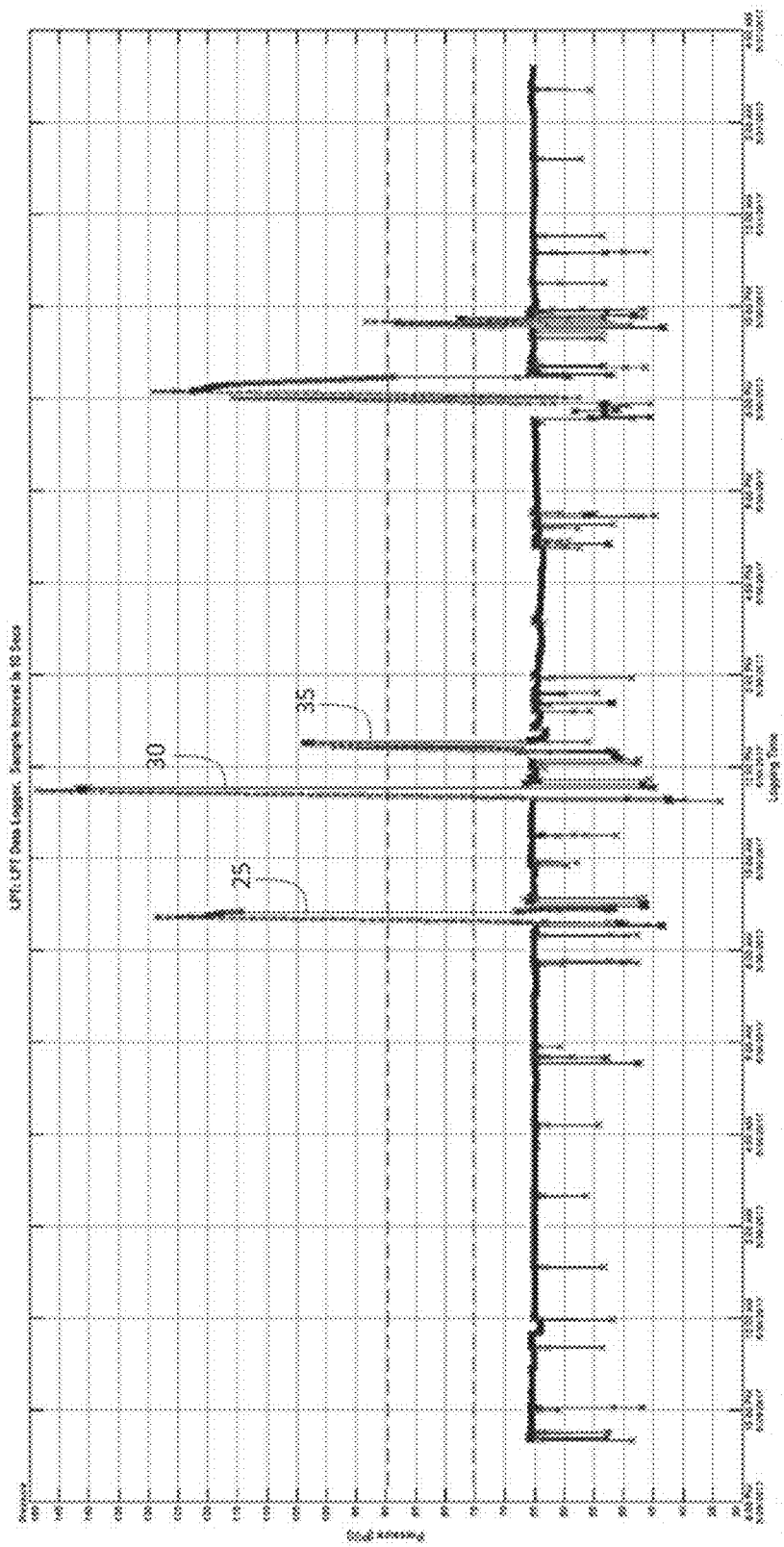
FIG. 2 shows water pressure measurements in a residence without a thermal expansion tank over 29 hours.

Causes of high pressure spikes in a plumbing system can include malfunction of devices such as pressure regulators on the main supply input and thermal expansion tanks associated with water heaters. Some systems, especially older construction, may not have a thermal expansion tank, leaving the system vulnerable to a buildup of high pressure or pressure surges due to water heater operation. For example, as seen in FIG. 2, the pressure in a residential plumbing system can surge over 140 psi in a system that does not have a thermal expansion tank. Some systems may not have a pressure regulator on the input, subjecting the system to the supply pressure from the municipality, which may be above the recommended limit a majority of the time, and furthermore can increase during times of low system usage. In addition, these pressure regulating components can malfunction and lose some or all of their regulating ability. As opposed to a leak, a malfunction in these regulating devices is currently invisible to a property owner and/or occupier, resulting in the potential for serious damage to the plumbing system and associated devices before any problem is identified and corrected. The devices disclosed herein ameliorate this previously unaddressed problem.

Figure 3:
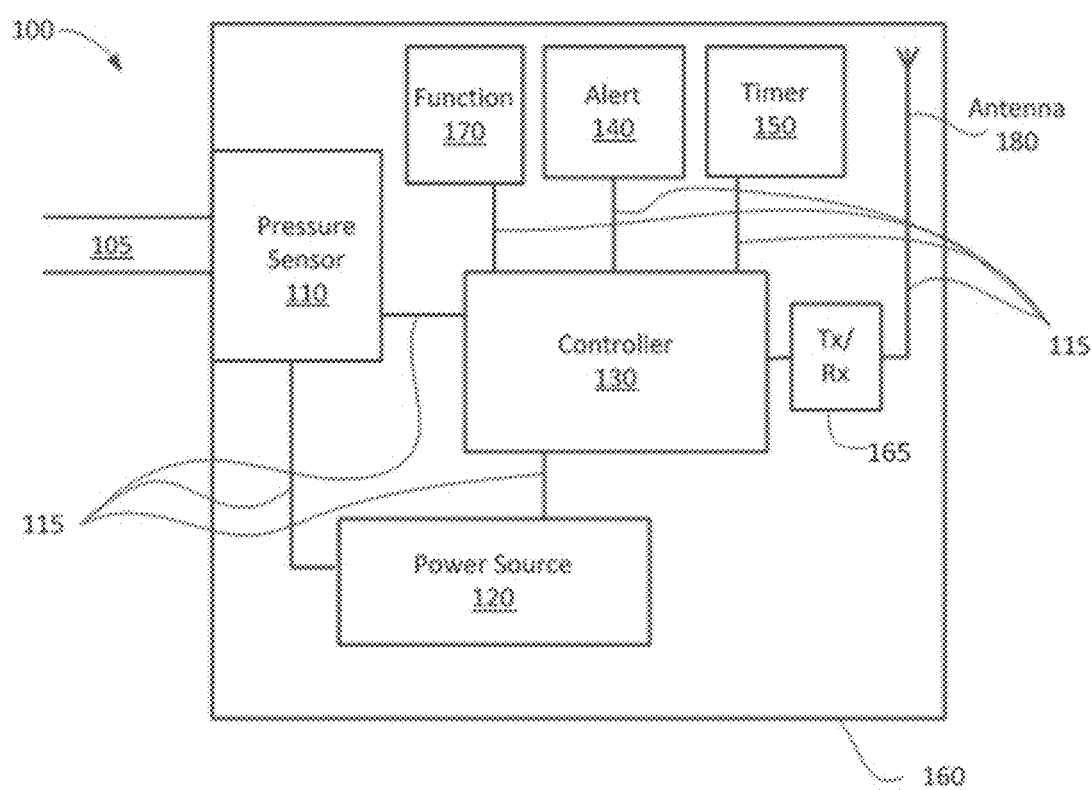
FIG. 3 shows an embodiment of a high pressure alarm.

FIG. 3 shows an embodiment of a high pressure alarm 100. The high pressure alarm 100 is connected to a water line 105 to monitor the pressure in water line 105. The water line 105 can be a flexible or rigid water supply line. The high pressure alarm 100 can be connected to the water line 105 via a threaded or push-fit connection. The high pressure alarm 100 can be connected to a closed or open pressurized system. The high pressure alarm 100 embodiment of FIG. 3 comprises a pressure sensor 110, controller 130, power source 120, alert 140, function control 170, timer 150, housing 160, transmit/receive circuitry 165, and antenna 180. The components of the high pressure alarm 100 are connected via electrical connections 115. The pressure sensor 110 is connected to the controller 130 and the power source 120. The pressure sensor 110 can be a pressure switch, transducer, strain gauge, or other means for sensing pressure that provides an output that is representative of a measured pressure. The power source 120 can be an internal source of power like a battery or can be an external source of power like 120 VAC or an Ethernet connection. In some embodiments, the power source may be mechanical power, for example, line pressure or water flow. The controller 130 may be connected to the alert 140 and can also be connected to the function control 170, timer 150, and/or antenna 180. It will be appreciated that not all of the components illustrated in FIG. 3 are necessary to implement embodiments of the invention. At least the function control 170, timer 150, transmit/receive circuit 165, and antenna 180 are optional as will be described below.

Figure 1:
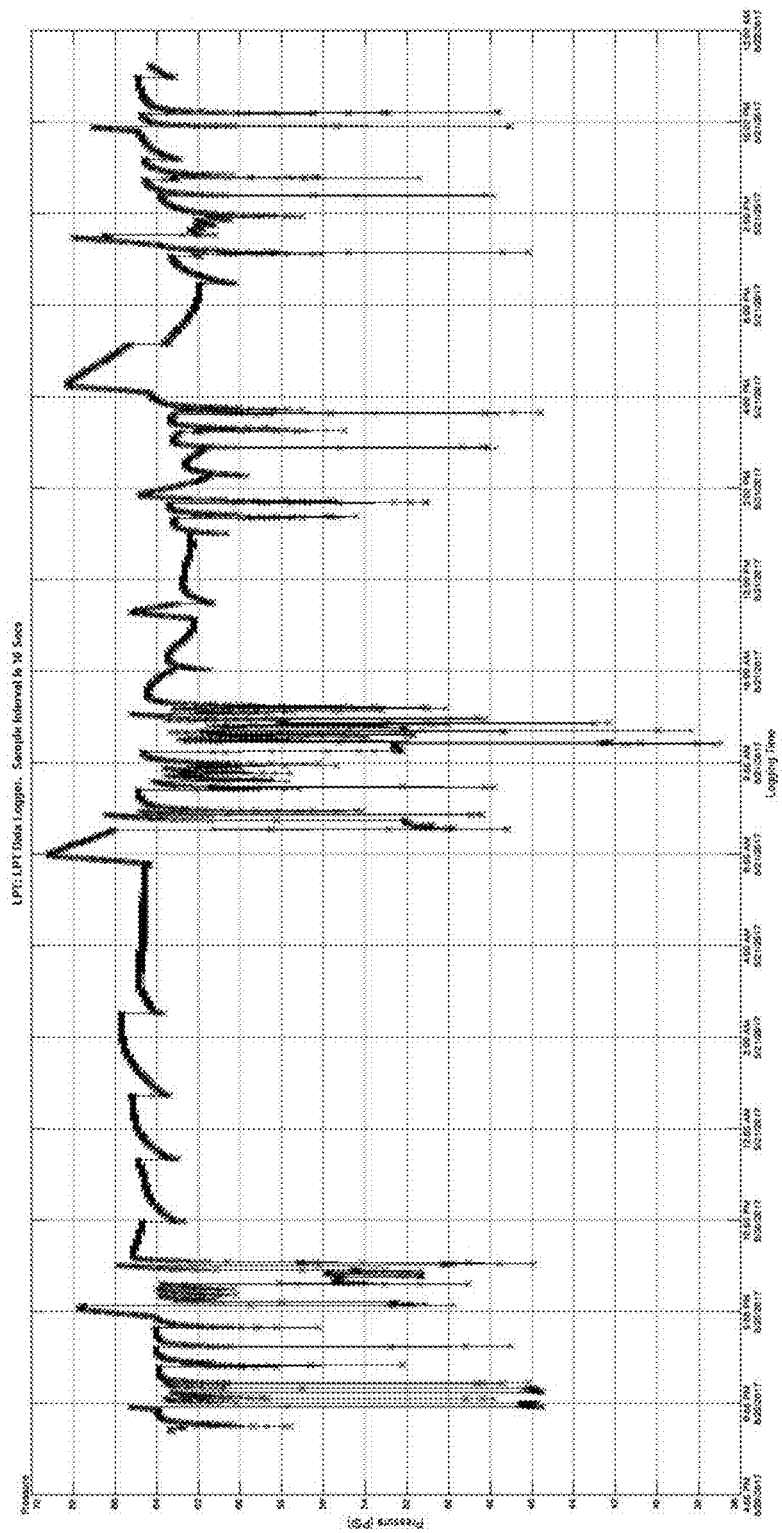
FIG. 1 shows water pressure measurements in a residence over 33 hours.
Figure 4:
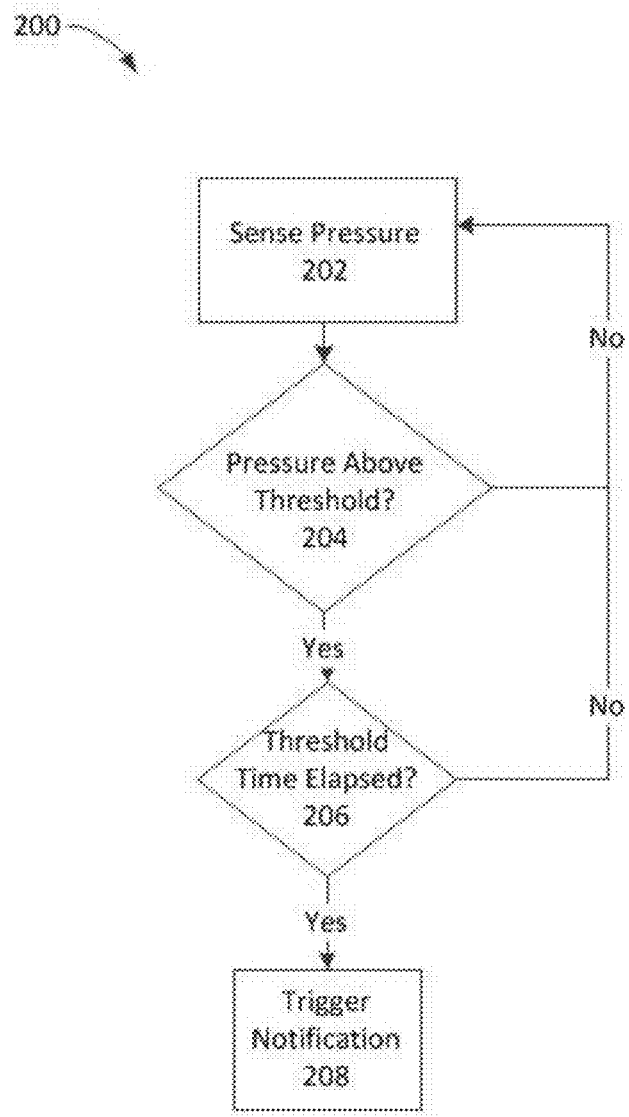
FIG. 4 shows an embodiment of a method of triggering a high pressure alarm.

FIG. 4 shows an embodiment of a method of identifying and indicating when a high pressure event has occurred that may be implemented by the device 100 of FIG. 3. The pressure sensor 110 can sense pressure 202. If the pressure is not above a threshold the high pressure alarm 100 continues sensing pressure 202. If the pressure is above a threshold, then the controller 130 may optionally determine whether the high pressure above the pressure threshold is maintained for a threshold time 206. When step 206 is implemented, the threshold time may be in the range of a few seconds to a few minutes. In some embodiments, the pressure threshold may be between 70 psi and 90 psi. In some embodiments, the pressure threshold may be between 75 psi and 85 psi. In some embodiments, the pressure threshold may be 80 psi. Referring back to FIG. 2 with respect to the choice of pressure threshold, it can be seen that thresholds of 75 to 90 psi catch basically the same set of high pressure events, whereas a threshold of 95 or 100 will begin to miss some. As seen in FIG. 1, a threshold at 70 psi or below will likely cause some false alarms during small high pressure excursions that are acceptable in the plumbing system.

If the sensed high pressure drops below the pressure threshold before the threshold time has elapsed, the high pressure alarm 100 continues to sense pressure 202. If the high pressure event continues until the threshold time has elapsed, a notification is triggered 208. In some embodiments, the controller 130 triggers the alert 140, which may be an audible, visual (e.g. light or LED), or mechanical alert (e.g. vibration, deploying a flag or post). In some embodiments, the notification may be an electronic signal or message sent to a mobile device, home automation monitoring system, webpage, or mobile app. In some embodiments, multiple notifications are triggered. For example, an audible alert may sound and an electronic message may also be sent to a mobile app.

High pressure may be caused by a failed pressure reducing valve, thermal expansion, or freezing conditions. High pressure may occur periodically, such as when the system has low use (e.g. during vacation or night time). The high pressure alarm 100 can help prevent damage to the plumbing system or appliances attached thereto by notifying a user when a high pressure event occurs. Many plumbing components can tolerate high pressure conditions momentarily; however, if high water pressure continues for an extended period, the plumbing system and/or appliances or fixtures attached to the plumbing system will eventually fail. In addition, pressure cycling (i.e. from 60 psi to 110 psi multiple times per day) fatigues plumbing components and shortens their useful life.

The steps of the method described above are exemplary only. A person of skill in the art would understand that the order of steps of the process could be performed in a different order, and one or more steps may be excluded. In some embodiments, method 200 may include a step requiring a threshold number of pressure events to occur before triggering a notification. For example, method 200 may require at least two pressure events to occur before triggering a notification. In some embodiments, method 200 may include a step of activating a supply or relief valve. In some embodiments, method 200 may include a step of silencing the device 100 for a set amount of time. For example, if the high pressure alarm 100 goes off in the middle of the night, a user may want to silence the notification, especially if it is an audible alert. The function control 170 may turn off the notification triggered in step 208 and monitor timer 150. After a set time has passed, a notification can be triggered again if the high pressure situation still exists. For example, the set time may be a value between about 1 hour and about 12 hours although shorter or longer periods are possible. In some embodiments, the user may want to silence the high pressure alarm for an extended period of time (e.g. at night when sleeping or during working hours).

Referring back to FIG. 3, in some embodiments the high pressure alarm 100 may have an antenna 180 to communicate with a mobile device, home automation monitoring system, webpage, or mobile app. The high pressure alarm 100 may send a notification to a user's mobile device, home automation monitoring system, building automation system, webpage, or mobile app, indicating that the high pressure alarm 100 has been triggered. The high pressure alarm 100 may communicate with the mobile device, home automation monitoring system, building automation system, webpage, or mobile app regarding the status of the power source 120. For example, the high pressure alarm 100 may send a notification to the user's mobile device, home automation monitoring system, building automation system, webpage, or mobile app that the power source 120 needs to be replaced. In some embodiments, the high pressure alarm 100 may send a digital output to log pressure data over time, communicate current pressure, or communicate current power level, etc. High pressure events can occur due to many different factors, like an absence or failure of a pressure reducing valve or a thermal expansion tank. The pressure logging can be used for troubleshooting as well.

A user may be given the ability to silence and/or reset the high pressure alarm 100 using the function control 170. The function control 170 can be a button, switch, or other known means in the art. A user may be able to silence and/or reset the high pressure alarm 100 for a set amount of time measured by timer 150. A high pressure event in a home, building, or irrigation system may not require immediate attention so it may be hours or even days before the causes of the high pressure event(s) are investigated and/or corrected. In instances where the alert 140 is audible, it is advantageous for the user to be able to silence the alert 140 using function 170. A user may also be able to test the high pressure alarm 100 using the function control 170 to check if the power source 120, the alarm 140, and other components are functioning properly.

Figure 5A:
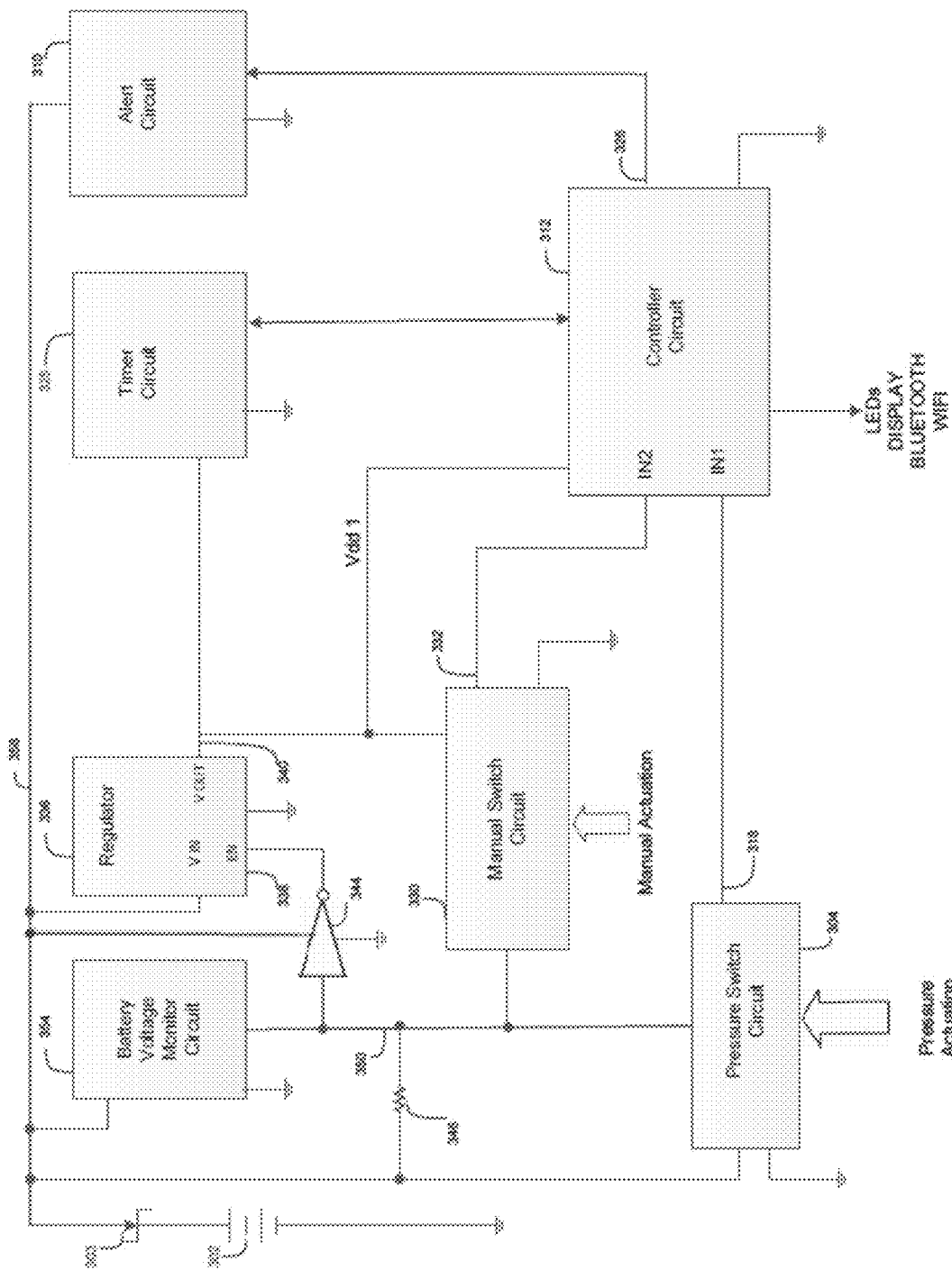
FIGS. 5A and 5B are schematic/block diagrams for embodiments of a high pressure alarm.

FIG. 5A is a schematic/block diagram of one implementation of a high pressure alarm 100 such as illustrated in FIG. 3 and configured to perform the method illustrated in FIG. 4 as well as other pressure monitoring and notification methods. In this implementation, components of the device include a battery 302, a pressure switch circuit 304, an alarm circuit 310, and a controller circuit 312. The battery 302 may be a conventional PP3 size 9-volt battery. If the battery is a 9-volt battery, a zener diode 303 may be provided to clamp the voltage supplied to the rest of the circuit at a lower level such as 5 or 6 volts that may be more suitable for the electronic components of the circuit. The pressure switch circuit 304 in this implementation comprises a pressure controlled switch that is open when the water pressure is below a threshold, and closed when the water pressure exceeds a threshold. Devices with this operation and a threshold fixed internally by the manufacturer are commercially available such as the SM-95A-80R/WL958 from Nason. A pressure transducer having an analog or digital output indicative of measured pressure could also be used in the pressure switch circuit. With a pressure transducer, the pressure threshold can be made adjustable with a comparator and/or with controller 312 programming. The controller 312 may be microcontroller of standard functionality widely commercially available such as the PIC12F1822 from Microchip Technology Inc. The output of the pressure switch circuit at node 318 is connected to an I/O pin (designated IN1 on FIG. 5A) of the controller 312. An output of the controller 312 at node 326 is asserted and de-asserted selectively by the controller 312 to control the operation of the alert 310. The alert may be of a variety of types as noted above. One example is the audible alarm PK-20A35EWQ from Mallory Sonalert. The microcontroller 312 is powered by voltage regulator 336, which has a voltage input connected to the battery output at node 358 and a voltage output designated $V_{dd1}$ connected to provide power to the controller 312. The enable input 338 of voltage regulator 336 is connected to the output of inverter 344 such that the voltage regulator 336 is enabled to provide power to the controller 312 when the input to the inverter at node 350 is low and the output of inverter 344 is high. As illustrated in FIG. 5A, node 350 which provides the input to inverter 344 is connected to an output of the pressure switch circuit 304, an output of a battery voltage monitor circuit 354, and also to the battery output at node 358 through a pull-up resistor 346.

When operating in a low pressure environment with a charged battery, the outputs of the pressure switch circuit 304 the battery voltage monitor circuit 354 and the manual switch circuit 330 that are connected to node 350 are in a high impedance open circuit state, and node 350 is held high by the coupling of node 350 to the battery output through pull-up resistor 346. When node 350 is high, the output of the inverter 344 is low, the voltage regulator 338 is not enabled, and the controller 312 is not powered and is in an off state. This is advantageous as it minimizes power consumption of the device under low pressure and normal battery conditions which are expected most of the time. In this state, the pressure switch circuit 304 is also configured to have its output 318 that is connected to the controller 312 tied to ground voltage. Also in this state, the manual switch circuit 330 is configured to have its output 332 that is connected to controller 312 tied to ground voltage.

If the pressure exceeds the threshold and the pressure switch component of the pressure switch circuit 304 closes, the pressure switch circuit 304 changes its outputs such that the output connected to node 350 transitions from open circuit to ground and the output 318 connected to IN1 transitions from low to high. When node 350 is pulled low by the pressure switch circuit output, the inverter 344 output goes high. When this happens, the voltage regulator 336 becomes enabled and powers up the controller 312. When the controller 312 turns on, and sees that the IN1 signal is high instead of ground, the controller 312 will assert its output at 326, turning on the alert 310. If/when the pressure drops back below the threshold, the pressure switch will open, node 350 will return to a high state disabling the voltage regulator 336 and shutting off the controller 312 and the alert. Also, the output 318 of the pressure switch circuit will transition back to ground. The high pressure situation can additionally or alternatively be indicated by LEDs or a display, wherein the alert 310 may be an audible alarm. An alert in the form of an electronically transmitted notification may additionally or alternatively be sent via wireless or wired communication channels to indicate to the user the existence of a high pressure condition.

In the implementation of FIG. 5A, the optional battery voltage monitoring circuit 354 can also awaken the controller 312. The battery voltage monitoring circuit 354 can be configured to compare the voltage at node 358 with a threshold voltage. If the voltage at node 358 drops below the threshold, the output of the battery voltage monitoring circuit 354 that is connected to node 350 may be pulled low, enabling the voltage regulator 336 and powering up the controller 312. In this situation, the controller will see after it powers up that the IN1 and IN2 inputs are grounded because the pressure switch circuit 304 and the manual switch circuit 330 have not been actuated. In this situation, the cause of the wake up is therefore concluded to be the battery voltage monitor circuit 354. In this situation, the controller may cause the alert to chirp in a predetermined manner indicating that the battery is low and should be changed. This condition may also or alternatively be indicated by LEDs, a display, an electronic communication, etc.

The manual switch circuit 330 is an optional component that can provide a variety of additional functionality to the pressure monitor. The manual switch circuit may, for example, include a non-locking spring biased push button that is closed when being actively pressed down by a user and that springs back to an open configuration when the user releases the button. In one implementation, when the manual switch circuit is actuated by pressing on such a button, the manual switch circuit makes output 332 transition from low to high, and makes the output connected to node 350 go low. This awakens the controller 312 in a manner similar to the battery voltage monitoring circuit and the pressure switch circuit. In this situation, when the controller 312 wakes up, it will see IN2 high, and IN1 low. This indicates that the manual switch circuit 332 caused the controller 312 to wake up. In response, the controller 312 may toggle the alert output 326 in a particular pattern. This may provide a circuit test function, where hearing the pattern from the alert tells the user that the controller and the alert are functional.

A timer circuit 325 may also optionally be included. With a timer circuit 325, if the controller 312 is awakened and IN1 is high, instead of immediately activating the alert 310, the controller may count pulses from the timer circuit 325 and wait a predetermined time such as a few seconds or a few minutes with IN1 high before activating the alert. This can be used to implement decision block 206 of FIG. 3 described above.

Additional desirable functionality is the ability of a user to turn the alert off, even if the pressure remains high. A simple implementation of this with the circuit of FIG. 5A is to program the controller 312 to de-assert output 326 if IN2 goes high while IN1 is already high because of a high pressure state. Thus, actuating the manual switch circuit 330 can silence the alert functionality during a high pressure state, and test the alert functionality during a low pressure state.

Figure 5B:
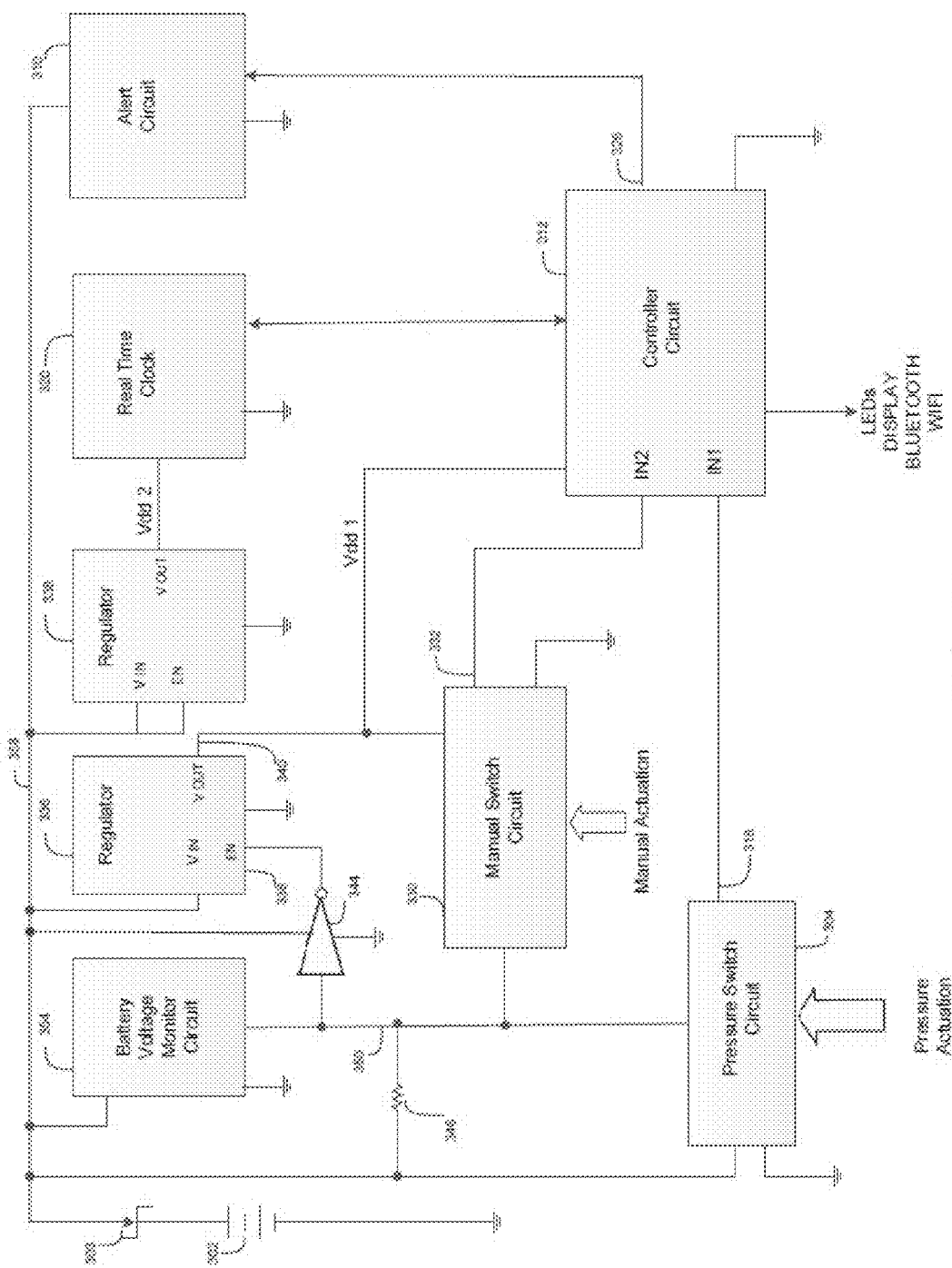

Another embodiment implementing alert silence functionality is shown in FIG. 5B. A real time clock 320 may be provided in this embodiment coupled to I/O pins (typically two pins) on the controller 312. The controller 312 can set the date and time of the clock and can read the date and time from the clock. In the implementation of FIG. 5B, the real time clock 320 is powered continuously (as long as battery 302 is installed) through voltage regulator 338 which has voltage and enable inputs connected to the battery output, and a voltage output designated $V_{dd2}$ connected to provide power to the real time clock 320. The real time clock therefore does not turn on and off like the controller 312 with high and low pressure in the plumbing system.

With this clock 320, the switch circuit 330 can provide a way for the user to manually silence the alarm so that it turns off the alarm during a high pressure event for a predetermined period. In this implementation, and similar to FIG. 5A, when the switch of the manual switch circuit 330 is closed, node 332, which is normally grounded, is pulled high. If this transition at IN2 is detected by the controller 312 while IN1 is high and the output 326 is asserted, the controller 312 may de-assert its output at 326, and set the real time clock. Once the real time clock is set and running, the controller will monitor the real time clock output. When a predetermined time has passed, such as several hours, 12 hours in one advantageous implementation, the controller will go back to normal operation and the alert will be turned on again if the pressure in the plumbing system is high.

After the alarm is silenced, the controller 312 may be turned off if a lower pressure situation is or becomes present during the predetermined time period, e.g. the following 12 hours. As can be seen in FIG. 2, if the alarm is silenced during the high pressure event designated 25, over the next several hours the pressure switch will open and close a few times before a several hour silence period expires as the pressure drops and increases through high pressure events 30 and 35. If the alarm is silenced at the high pressure event 25 for 12 hours, the high pressure events 30 and 35 should not trigger the alarm. Therefore, when the controller 312 wakes up at the beginning of event 30, the controller should be able to determine if it has been silenced, and if so, when the silence period is to end. This can be done by appropriate setting of the real time clock. For example, if the real time clock is set to noon on Dec. 31, 2000 whenever the alert is silenced by a user pressing the manual switch as described above, when a 12 hour silence period ends, the year in the real time clock 320 will roll over to 2001. If the controller turns off and then on again, it can check the year in the real time clock. If it is 2000, then the controller doesn't activate the alert, even though IN1 may be high, because the year 2000 from the real time clock indicates a silence period is in effect. If the year is 2001, then the controller will turn on the alert as the silence period will have expired. The real time clock 320 can be initialized to year 1900 for example in the factory, and then if the controller wakes up and the year is earlier than the year 2000, the controller will also know that no silence period is active.

The switch 330 may also provide a reset function if the alarm is silenced during a high pressure event that triggered the alarm. For this function, the switch 330 may be closed for a relatively long period of time (e.g. about 10 seconds or more), also measured by the controller 312 as described above. In response to a long term switch closure which holds IN2 high for a long period, the controller 312 may toggle the node 326 between high and low one or more times to make the alarm chirp audibly as an acknowledgement to the user, reset the clock to Jan. 1, 1900 and then continue to monitor the state of the pressure switch 304.

Figure 6:
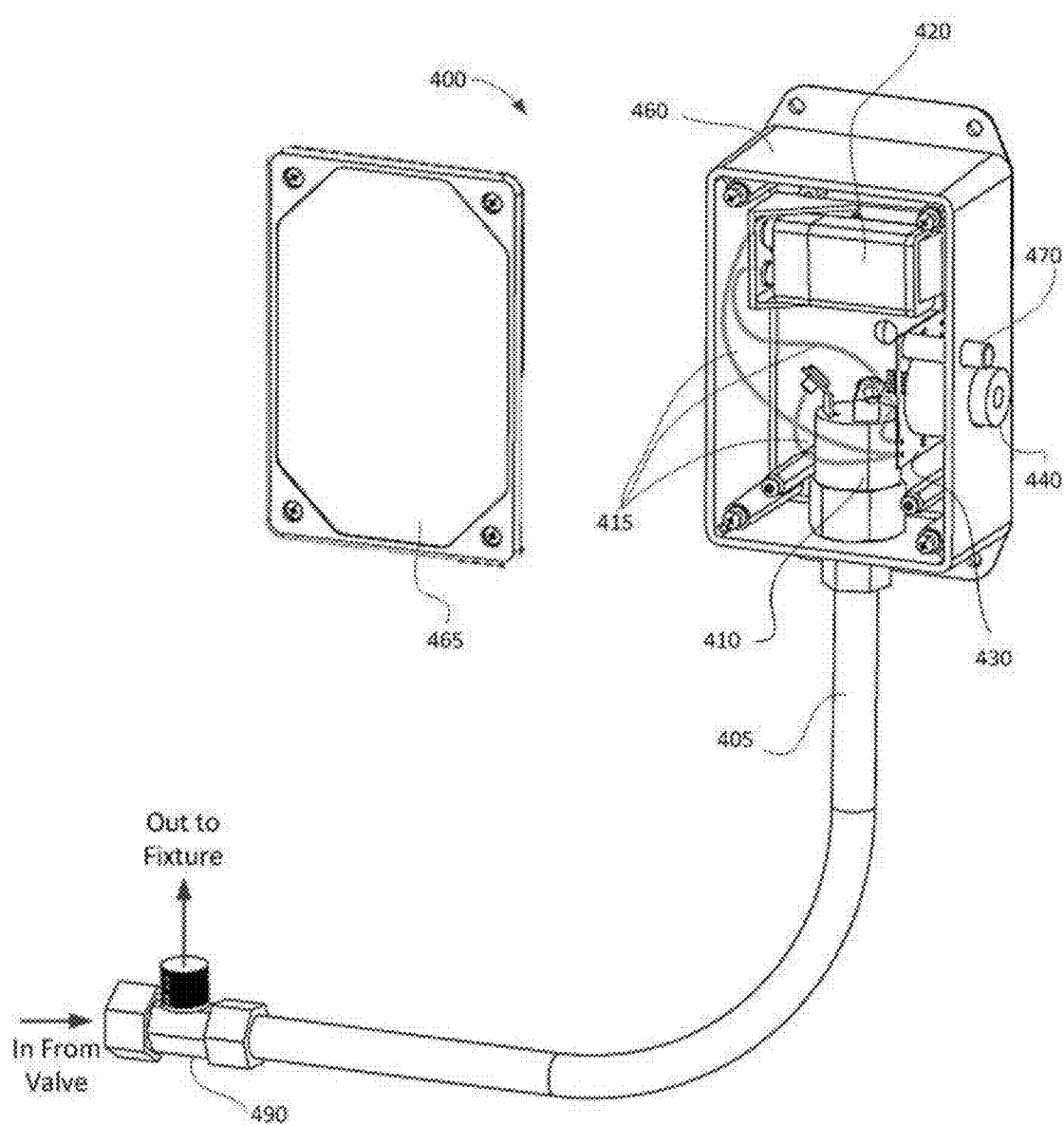
FIG. 6 is a perspective view showing an embodiment of a high pressure alarm.

FIG. 6 shows an embodiment of a high pressure alarm 400. The high pressure alarm 400 has a housing 460 and a face plate 465. The face plate 465 may be removable. In some embodiments, the face plate 465 may not be removable such that the housing 460 is continuous. The face plate 465 may be removed so that a user can access the internal components. For example, the face plate 465 may be removed so that the power source 420 can be replaced. The pressure sensor 410 is connected to water line 405 via threaded or push-fit connection. The water line 405 can be a flexible or rigid water supply line. The water line 405 may be a conventional ⅜" compression connection faucet connector hose. In some embodiments, the pressure sensor 410 has a custom thread and is configured to connect directly to a commonly used plumbing flexible line (e.g. compression 9/16-24 UNEF water line). The pressure sensor 410 is connected to controller 430 and power source 420 via electrical connections 415. The water line 405 is connected via tee-fitting 490 to a water supply (e.g. shut-off valve) and a fixture or appliance (e.g. sink, toilet, water heater, irrigation system, etc.). In some embodiments, the water line 405 is connected to the water supply with any suitable connection. Water comes into the tee-fitting 490 from the shut-off valve and goes out to the fixture and through water line 405 to the pressure sensor 410. If the pressure exceeds a certain threshold pressure, then alarm 440 sounds. A user may be able to silence, test, and reset the high pressure alarm 400 by using function button 470 as described above which may form part of the manual switch circuit 330 of FIG. 5A and FIG. 5B.

Figure 7A:
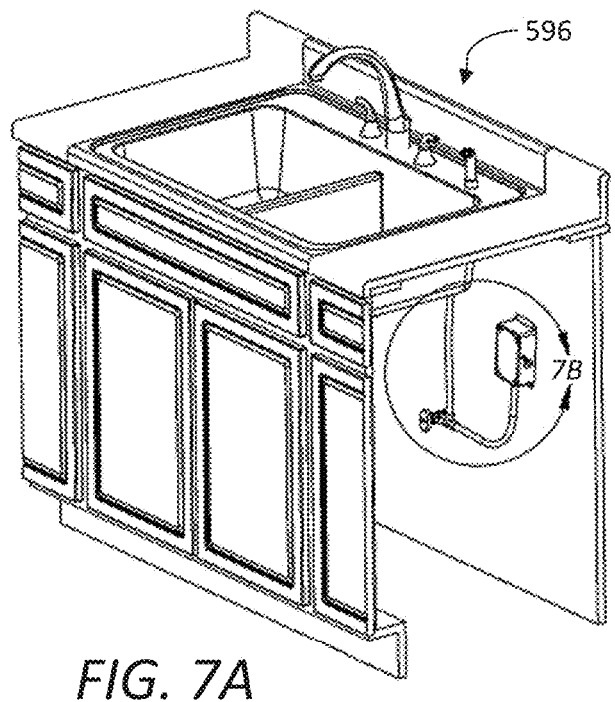
FIG. 7A is a perspective view showing an embodiment of a high pressure alarm mounted under a sink.
Figure 7B:
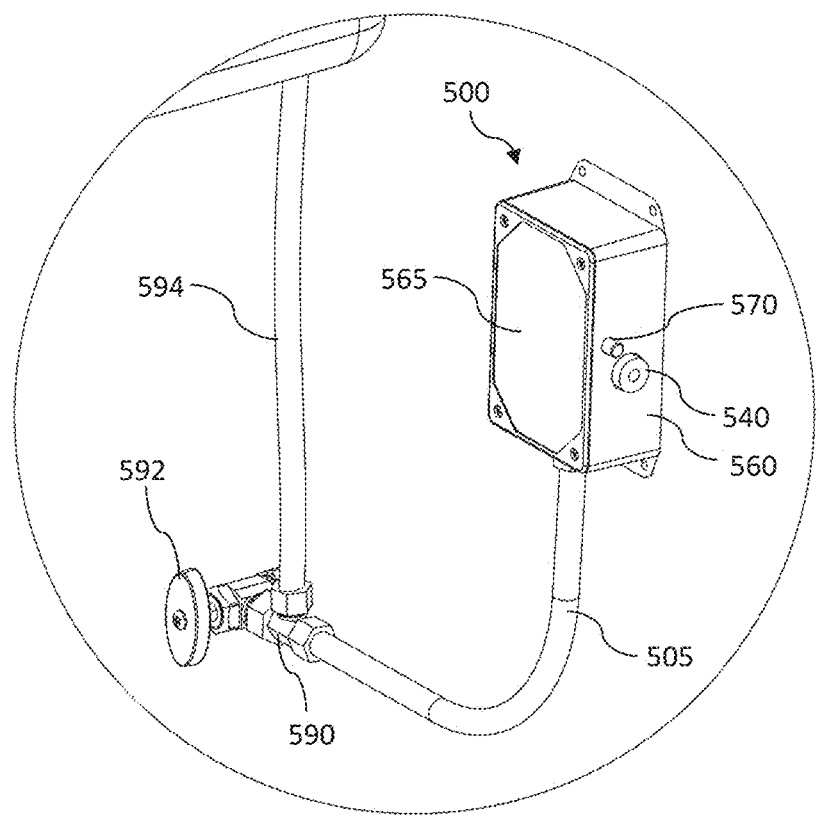
FIG. 7B is a close-up perspective view showing the high pressure alarm mounted under a sink.

FIG. 7A shows an embodiment of a high pressure alarm 500 mounted under a sink fixture 596. FIG. 7B shows a close up view of the high pressure alarm 500 and its connection to the shut-off valve 592. A Tee-fitting 590 connects the high pressure alarm 500 with the shut-off valve 592. Water flows into the Tee-fitting 590 from the shut-off valve 592 and out to the sink 596 via water line 594 and out to the high pressure alarm 500 via water line 505. If the pressure exceeds a certain threshold pressure, then the alarm 540 will sound. A user can reset the high pressure alarm 500 by using function button 570.

The housing 560 of the high pressure alarm 500 has a low profile so as to better fit under the sink 596. The alarm 540 and function button 570 are shown on the side of the high pressure alarm 500 but can be located in other positions. The location on the side is preferred for ease of access by the user. The face plate 565 prevents access to the internal components of the high pressure alarm 500. The face plate 565 can protect the internal components from being damaged when things are placed under the sink 596. In some embodiments, the housing 560 may be ruggedized such that the high pressure alarm 500 may be positioned outside.

Figure 8:
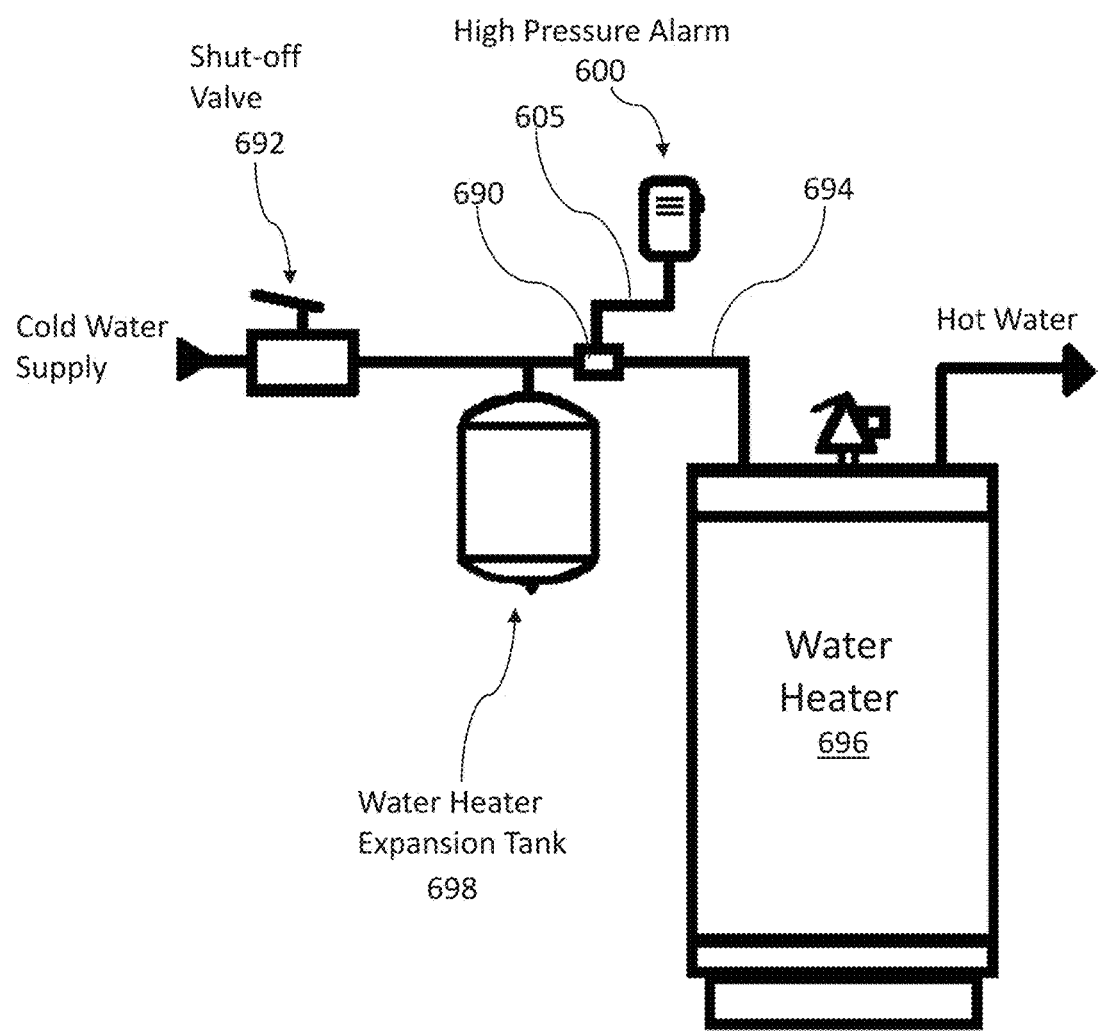
FIG. 8 shows an embodiment of a high pressure alarm connected to a water heater.

FIG. 8 shows an embodiment of a high pressure alarm 600 connected to a water heater 696. Shut-off valve 692 is connected to a cold water supply. The high pressure alarm 600 is connected to the shut-off valve 692 via tee-fitting 690. Water flows into the tee-fitting 690 from the shut-off valve 692. Water flows out of the tee-fitting 690 to the high pressure alarm 600 via water line 605 and to the water heater 696 via water line 694. There can also be a water heater expansion tank 698 connected to the shut-off valve 692.

In some embodiments, the high pressure alarm 600 can be incorporated into the water heater 696, water heater expansion tank 698, or other plumbing fixture or appliance. In some embodiments, the high pressure alarm may connect to or be incorporated in a beverage dispensing machine (e.g. coffee, water, etc.), icemaker, water filtration system, dishwasher, washing machine, water filtration system, or irrigation system.

Figure 9:
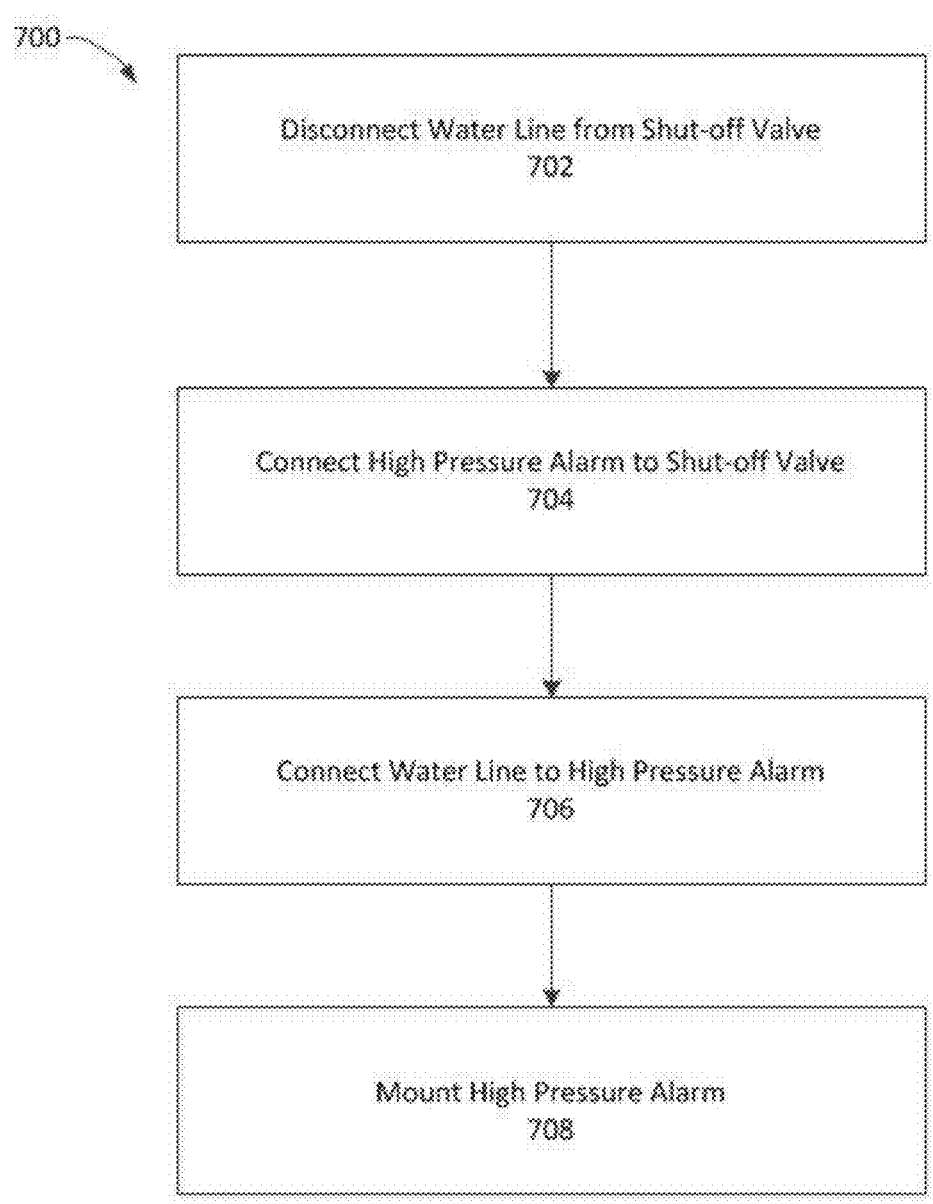
FIG. 9 shows an embodiment of a method of installing a high pressure alarm.

FIG. 9 shows an embodiment of a method of installation of a high pressure alarm 700. First, disconnect water line from the shut-off valve 702. Connect high pressure alarm to shut-off valve 704. Connect water line that was disconnected in step 702 to high pressure alarm 706. Mount high pressure alarm 708. The steps of the method described above are exemplary only. A person of skill in the art would understand that the order of steps of the process could be performed in a different order, and one or more steps may be excluded, as desired. For example, step 706 can occur before step 704 or step 708 can occur before step 702. These steps can be done by a plumber or are simple enough that a consumer with little plumbing knowledge can install a high pressure alarm by himself or herself. These steps can be performed using household tools.

In some embodiments, the connecting high pressure alarm to shut-off valve step 704 may include connecting the high pressure alarm via a flexible or rigid connection. In some embodiments, the mounting high pressure alarm step 708 may include mounting the high pressure alarm to a wall, such as a wall of a sink cabinet or wall of a room. The mounting may be via nails, screws, adhesive, or other mounting means known in the art. In some embodiments, the high pressure alarm is not mounted. For example, when the high pressure alarm is connected via a rigid pipe connection, the high pressure alarm can be supported by the rigid pipe connection and does not require mounting. In some embodiments, the high pressure alarm is placed on a surface (e.g. floor or shelf) and is not mounted to a wall.

In some embodiments, the high pressure alarm can be installed in a residence. In other embodiments, the high pressure alarm can be installed in an office, commercial building, medical facility, industrial facility, boat, or RV.

A kit that contains some or all of the components shown in FIG. 6 can be provided for sale at hardware stores and the like. The kit may include the alarm 500, conduit 505, and tee fitting 590. These items may be provided in a single package. This kit may be easily installable as described above by homeowners and others with little to no plumbing experience. The method of FIG. 9 used to create an installation such as shown in FIG. 7A and FIG. 7B can be performed easily with the water valve 592 turned off by removing one connection and creating two. This may be performed with only a wrench. A wrench for the installation may also be provided in the kit. In addition, mounting hardware such as screws for placing the alarm on a wall or other surface may also be provided in the kit.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The term "comprising" as used herein is synonymous with "including," "containing," or "characterized by," and is inclusive or open-ended and does not exclude additional, unrecited elements or method steps.

What is claimed is:

1. A device for sensing high pressure in a pressurized water piping system comprising:
    a high pressure sensor connectable to a power source, the high pressure sensor configured to sense a pressure of the pressurized water piping system;
    a timer;
    a controller in communication with the pressure sensor and the timer, the controller configured to generate a notification when the sensed pressure is greater than a selected value for a selected time; and
    a voltage regulator connected to the controller and configured to provide power to the controller during a first condition and to not provide power to the controller during a second condition,
    wherein the first condition includes at least when the sensed pressure is greater than the selected value and the second condition includes at least when the sensed pressure is not greater than the selected value.

2. The device of claim 1, wherein the notification is an electronic signal.

3. The device of claim 1, further comprising an alert, wherein the notification triggered by the controller is the alert.

4. The device of claim 3, wherein the alert is a mechanical alert.

5. The device of claim 3, wherein the alert is an audible and/or visual alert.

6. The device of claim 1, further comprising the power source.

7. The device of claim 1, further comprising a function control, the function control configured to silence the notification triggered by the controller.

8. The device of claim 1, wherein the selected value of pressure is between 70 psi and 90 psi.

9. The device of claim 1, wherein the selected time is about 1 second.

10. The device of claim 1, further comprising a housing that houses at least the high pressure sensor, timer, and controller.

11. The device of claim 1, further comprising a database in communication with the controller for storing records of high pressure events detected by the pressure sensor.

12. The device of claim 1, further comprising a real time clock connected to the controller and configured to indicate whether a set time has expired.

13. A system for sensing high pressure in a pressurized water piping system comprising:
    a water shut-off valve connected to a plumbing fixture or appliance;
    a pressure sensor fluidly connected to the water shut-off valve, the pressure sensor being configured to sense a pressure of the pressurized water piping system;
    a power source connected to the pressure sensor;
    an alert connected to the pressure sensor and the power source; and
    a function control configured to silence the alert for a set time,
    wherein the power source is configured to provide power to the system during a first condition and to not provide power to the system during a second condition, wherein the first condition includes at least when the sensed pressure is greater than a selected value and the second condition includes at least when the sensed pressure is not greater than the selected value.

14. The system of claim 13, further comprising a timer, wherein the alert is triggered when a pre-determined water pressure condition occurs and pre-determined time has elapsed.

15. The system of claim 13, wherein the plumbing appliance is a water heater.

16. The system of claim 15, wherein the pressure sensor and the alert are incorporated in the water heater.

17. The system of claim 13, wherein the plumbing fixture is a sink.

18. The system of claim 13, further comprising a water line that connects the pressure sensor to the water shut-off valve.

19. The system of claim 13, further comprising a housing that houses at least the pressure sensor and the alert.

20. The system of claim 13, wherein the alert is configured to be triggered when at least two pressure events occur, wherein a pressure event occurs when the pressure sensor senses a pressure that exceeds a set pressure.

21. A kit for sensing high pressure in a plumbing system comprising:
    a plumbing pressure monitor comprising a housing containing a pressure sensor, a controller, an alert, and a voltage regulator connected to the controller and configured to provide power to the controller during a first condition and to not provide power to the controller during a second condition, wherein the plumbing pressure monitor is configured to sense pressure in the pressurized water system and alert a user to a high pressure condition in a plumbing system;

a tee-fitting; and a conduit connectable to the pressure sensor at one end and the tee-fitting at the other, wherein the first condition includes at least when the sensed pressure is greater than a selected value and the second condition includes at least when the sensed pressure is not greater than the selected value.

22. The kit of claim 21, wherein the plumbing pressure monitor comprises an audible alert mounted in or on the housing.

23. The kit of claim 22, wherein the plumbing pressure monitor comprises a user accessible function control button mounted in or on the housing.

24. The kit of claim 21, wherein the housing is ruggedized.

* * * * *